United States Patent [19]

Gapinski

[11] Patent Number: 5,250,964
[45] Date of Patent: Oct. 5, 1993

[54] SPECTACLE HINGE HAVING FLANGE PLATES AND RESILIENT CUP MEMBER

[76] Inventor: Marie E. Gapinski, 518 Maple Ave., Waukesha, Wis. 53186

[21] Appl. No.: 826,041

[22] Filed: Jan. 27, 1992

[51] Int. Cl.$^5$ .......................... G02C 5/14; G02C 5/22
[52] U.S. Cl. ...................................... 351/153; 351/121
[58] Field of Search ................. 351/121, 153; 16/228; 2/450

[56] References Cited

U.S. PATENT DOCUMENTS 3,264,678  8/1966  Parmellee ........................... 351/153

Primary Examiner—Rodney B. Bovernick
Attorney, Agent, or Firm—Leon Gilden

[57] ABSTRACT

A hinge arranged for a spectacle includes a readily replaceable hinge rod directed through the hinge assembly, including a resilient cap securable to an uppermost flange receiving the cap. A modification of the invention includes the cap arranged for accommodation of a tether cord thereto. A further modification of the invention includes a self-lubricating and indicator hinge assembly mounted to the spectacle structure.

5 Claims, 4 Drawing Sheets

SPECTACLE HINGE HAVING FLANGE PLATES AND RESILIENT CUP MEMBER

BACKGROUND OF THE INVENTION

1. Field of the Invention

The field of invention relates to spectacle apparatus, and more particularly pertains to a new and improved spectacle hinge wherein the same is arranged for providing hinge mounting of spectacle temple legs relative to a spectacle frame.

2. Description of the Prior Art

Spectacle structure of various types are utilized throughout the prior art to accommodate the multitude of spectacle structure available. The instant invention is arranged to replace the relatively small screws and the like to secure the temple legs relative to the frame structure. Prior art temple leg frame structure is exemplified in the U.S. Pat. Nos. 4,865,437 to Neuhaus; 4,605,293 to Blumenthal; 4,844,606 to Smith; and the U.S. Pat. No. 4,461,549 to Reese, et al. setting forth a locking device to securably mount a line member relative to a spectacle structure.

As such, it may be appreciated that there continues to be a need for a new and improved spectacle hinge as set forth by the instant invention which addresses both the problems of ease of use as well as effectiveness in construction in accommodating securement of spectacle temple legs relative to a spectacle hinge and in this respect, the present invention substantially fulfills this need.

SUMMARY OF THE INVENTION

In view of the foregoing disadvantages inherent in the known types of spectacle hinge structure now present in the prior art, the present invention provides a spectacle hinge wherein the same is arranged for providing a readily removable hinge construction relative to the associated spectacle apparatus. As such, the general purpose of the present invention, which will be described subsequently in greater detail, is to provide a new and improved spectacle hinge which has all the advantages of the prior art spectacle hinges and none of the disadvantages.

To attain this, the present invention provides a hinge arranged for a spectacle including a readily replaceable hinge rod directed through the hinge assembly, including a resilient cap securable to an uppermost flange receiving the cap. A modification of the invention includes the cap arranged for accommodation of a tether cord thereto. A further modification of the invention includes a self-lubricating and indicator hinge assembly mounted to the spectacle structure.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved spectacle hinge which has all the advantages of the prior art spectacle hinges and none of the disadvantages.

It is another object of the present invention to provide a new and improved spectacle hinge which may be easily and efficiently manufactured and marketed.

It is a further object of the present invention to provide a new and improved spectacle hinge which is of a durable and reliable construction.

An even further object of the present invention is to provide a new and improved spectacle hinge which is susceptible of a low cost of manufacture with regard to both materials and labor, and which accordingly is then susceptible of low prices of sale to the consuming public, thereby making such spectacle hinges economically available to the buying public.

Still yet another object of the present invention is to provide a new and improved spectacle hinge which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
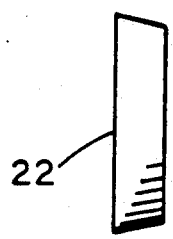
FIG. 1 is an orthographic side view of a resilient cap structure utilized by the invention.
Figure 2:
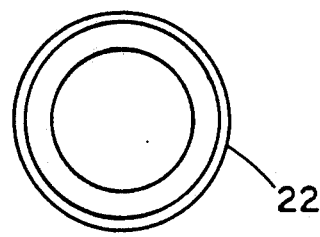
FIG. 2 is an orthographic bottom view of the spectacle hinge as set forth in FIG. 1.
Figure 3:
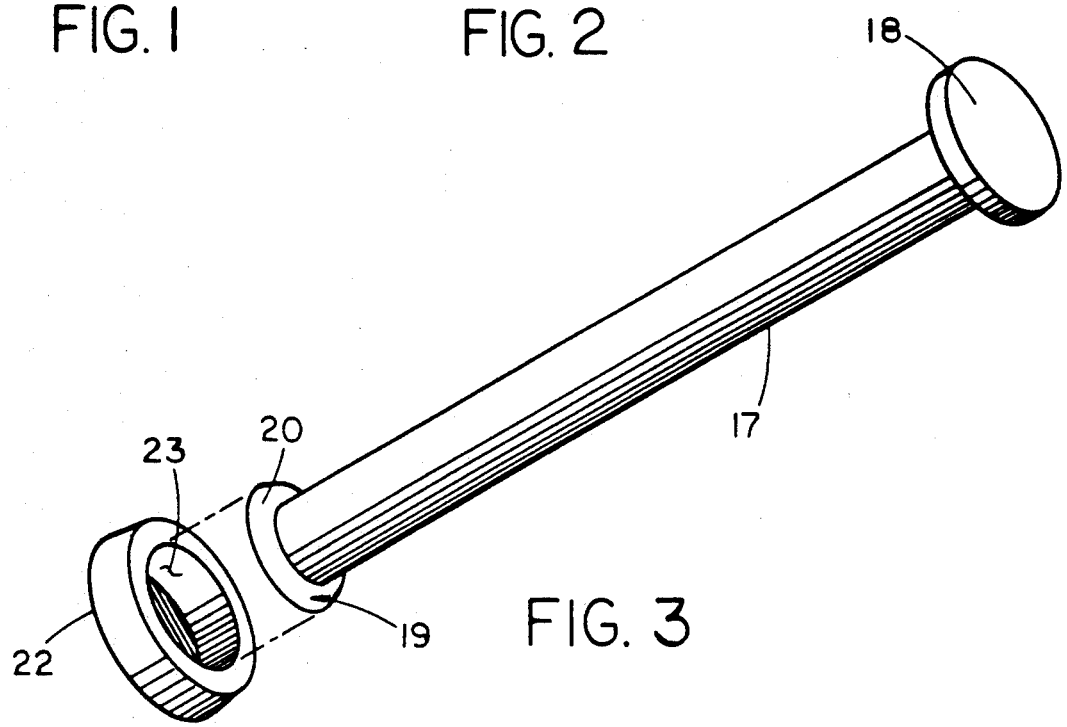
FIG. 3 is an isometric illustration of the hinge pin of the invention and associated cap structure.
Figure 4:
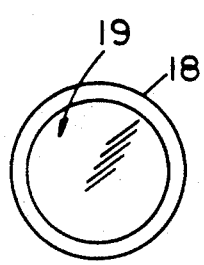
FIG. 4 is an orthographic top view of the hinge pin structure.
Figure 5:
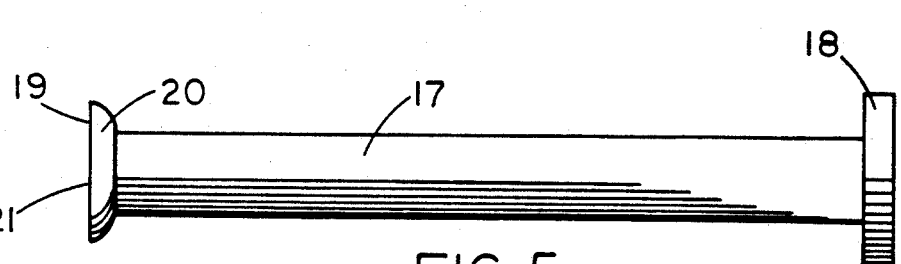
FIG. 5 is an orthographic side view of the hinge pin structure.

With reference now to the drawings, and in particular to FIGS. 1 to 11 thereof, a new and improved spectacle hinge embodying the principles and concepts of the present invention and generally designated by the reference numerals 10 and 10a will be described.

Figure 6:
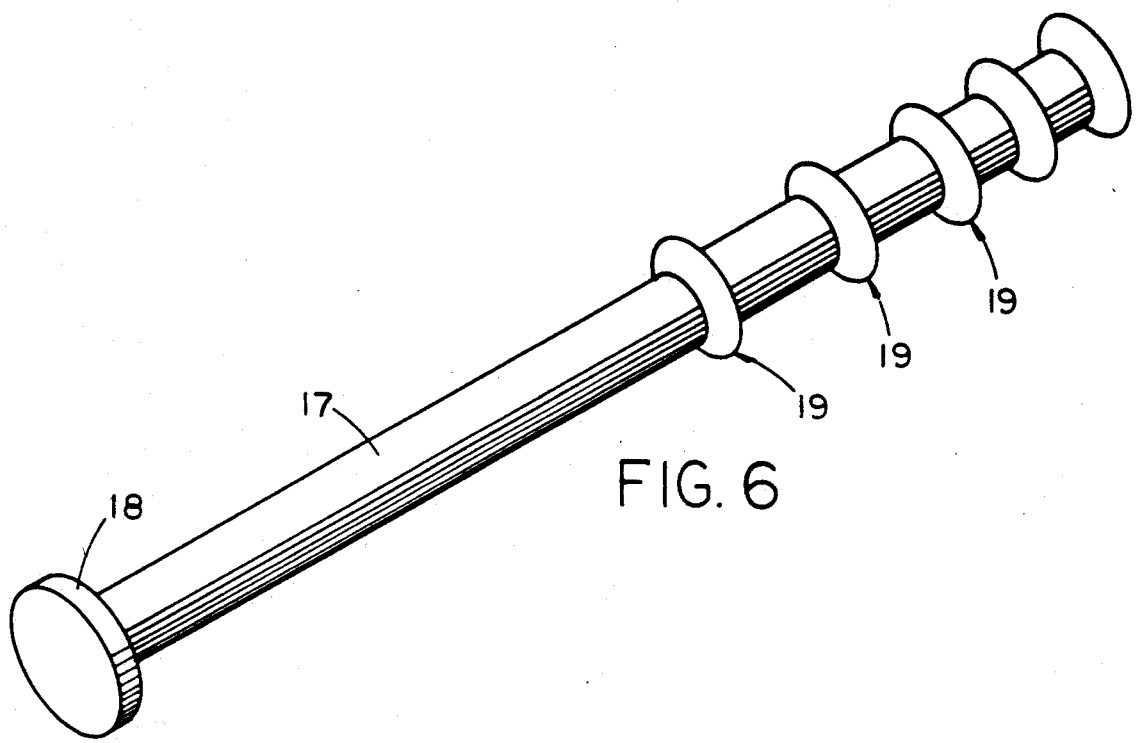
FIG. 6 is an isometric illustration of a modified hinge pin structure utilized by the invention.
Figure 8:
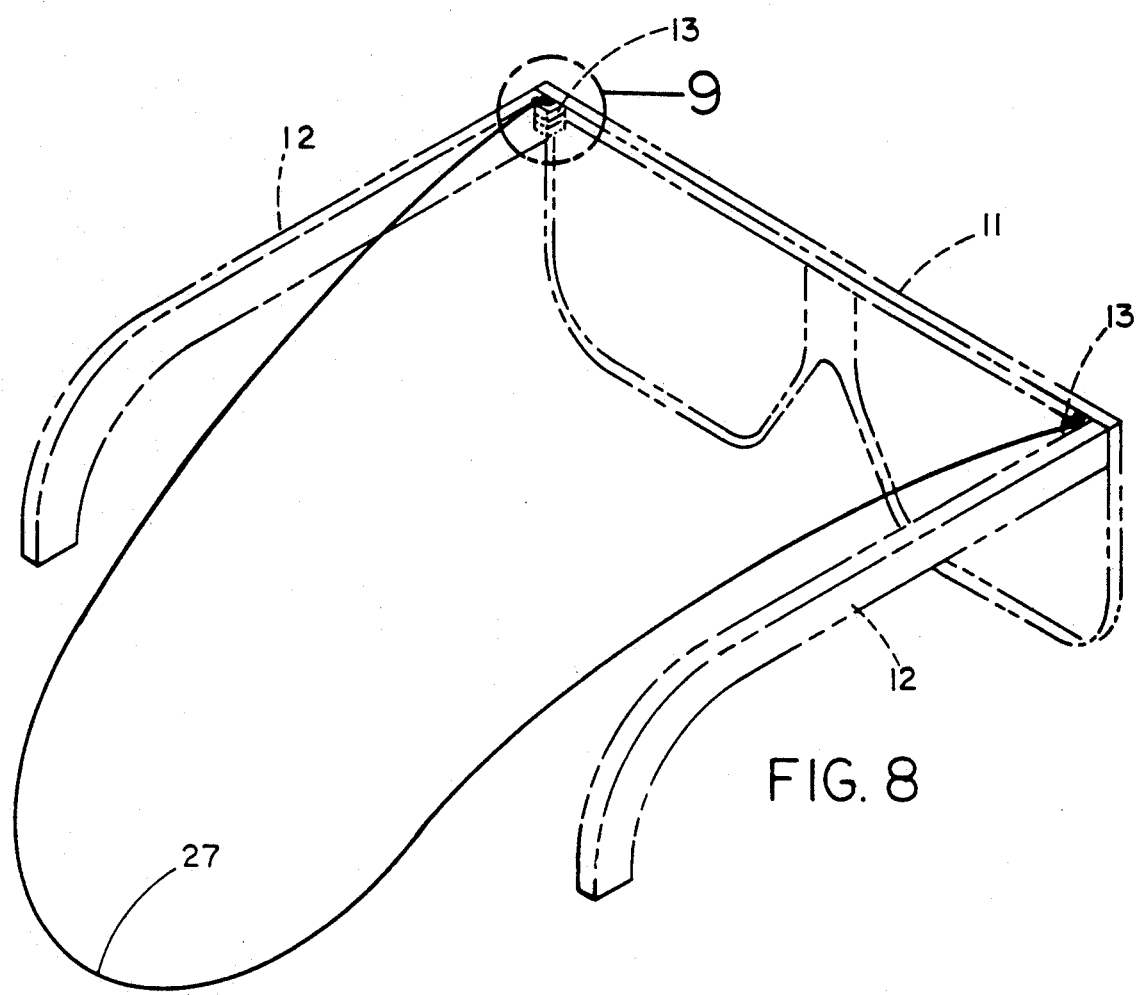
FIG. 8 is an isometric illustration of the spectacle construction in an assembled configuration.
Figure 9:
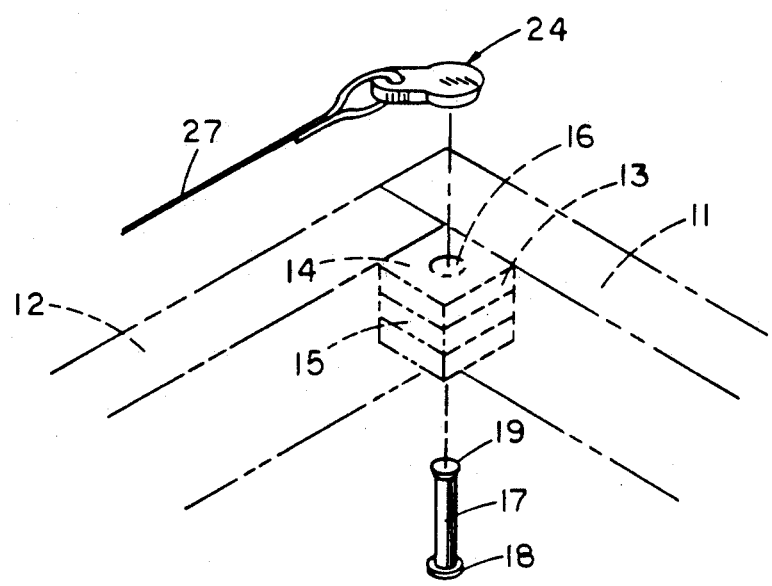
FIG. 9 is an isometric enlarged illustration of section 9 as set forth in FIG. 8.

More specifically, the spectacle hinge 10 of the instant invention essentially comprises the combination with a spectacle assembly, as illustrated in FIG. 8 for example, to include a spectacle frame 11 hingedly mounting a temple leg 12 at each opposed distal end of the spectacle frame 11. A hinge assembly 13 pivotally mounts each temple leg relative to the spectacle frame 11, wherein a plurality of frame hinge plates 14 are orthogonally oriented relative to the spectacle frame 11 and receive a temple leg hinge plate 15 therebetween, with a coaxially aligned hinge assembly bore 16 directed orthogonally through the hinge plates as the assembly bore is oriented parallel relative to the temple leg 12 and the associated spectacle frame 11. A tubular hinge pin 17 is received through the hinge assembly bore 16, with the hinge pin 17 arranged to include a cylindrical hinge pin first flange plate 18 orthogonally mounted to a lower first distal end of the hinge pin 17, with a hinge pin second flange plate 19 fixedly and orthogonally mounted to a second distal end of the hinge pin 17. The second flange plate 19 includes a planar top wall 21, with an arcuate side wall 20 to accommodate securement of a resilient cup member 22 about the second flange plate 19. The cup member 22 includes a cup member receiving cavity 23 to receive the second flange plate 19 in resilient engagement therewith. The FIG. 6 illustrates the use of a modified hinge pin 17 that includes frangible sections, each including a second flange plate 19, wherein the sections may be removed as required to utilize a predetermined length of hinge pin and as the associated second flange plate 19 in the organization as set forth in FIG. 6 is also frangibly connected relative to the tubular hinge pin 17.

Figure 7:
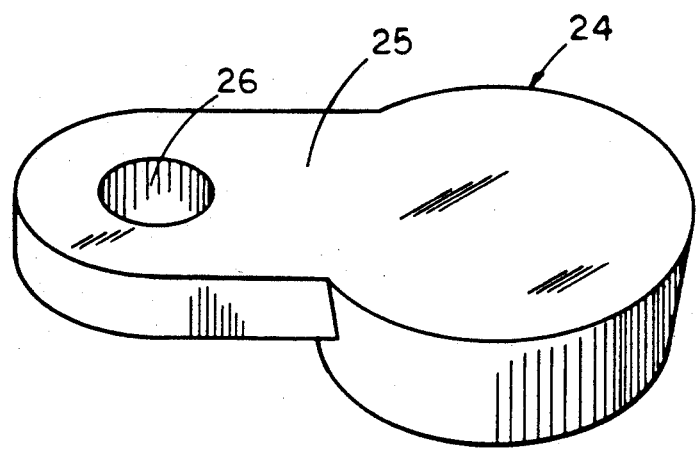
FIG. 7 is an isometric illustration of a modified cap structure utilized by the invention.

The FIG. 7 illustrates a modified resilient cup member 24 that includes an extension flange 25 extending in a coplanar relationship relative to the top wall of the cup member 22 as the extension flange 25 includes an extension flange bore 26 directed therethrough to receive a free end of a flexible tether cord 27. With reference to the FIG. 8, each distal end of the cord 27 is secured to a respective modified cup member 24 to provide for securement of the tether cord to the spectacle assembly.

Figure 10:
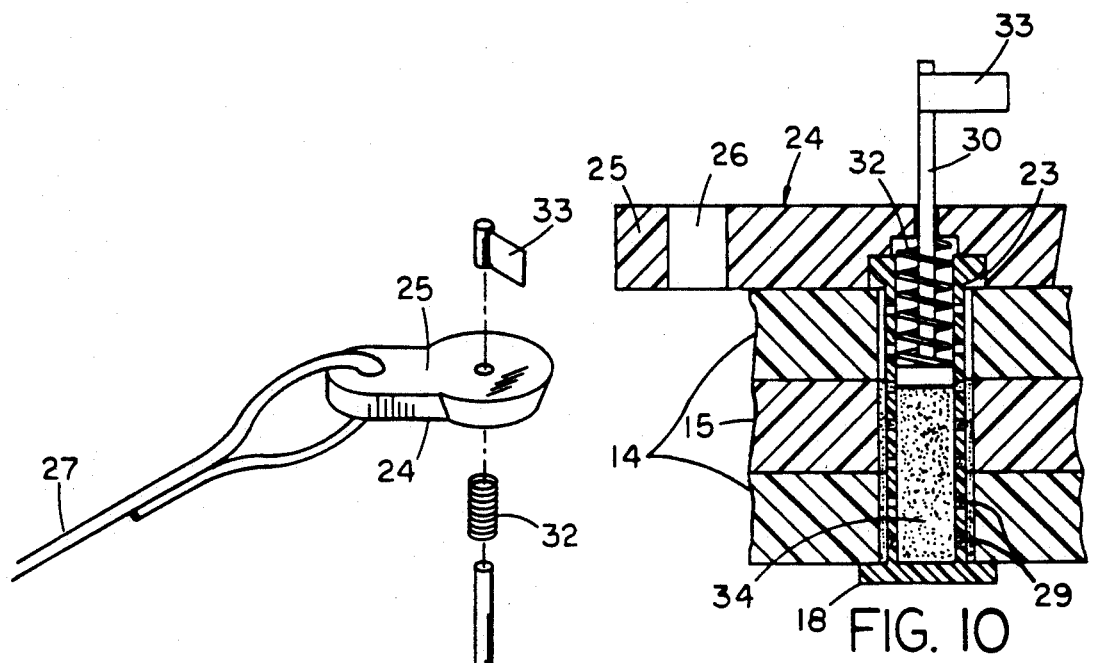
FIG. 10 is an orthographic cross-sectional illustration of the use of a modified hinge pin structure as set forth by the invention.
Figure 11:
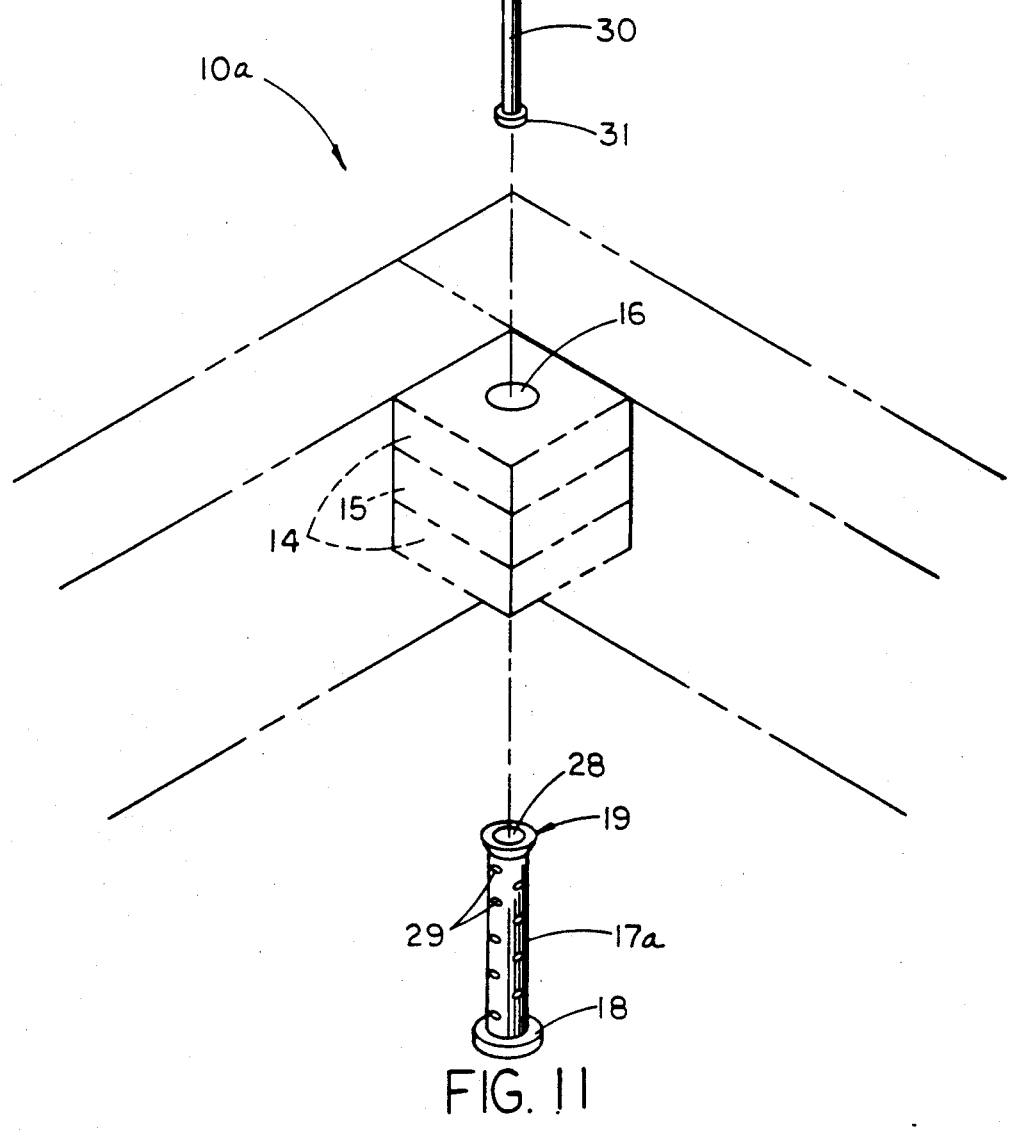
FIG. 11 is an isometric illustration of the modified spectacle hinge structure in an isometric exploded illustration.

The FIGS. 10 and 11 illustrate a modified spectacle hinge 10a to include a hinge pin central cavity 28 directed coextensively through the tubular hinge pin 17 that extends coaxially through the hinge pin second flange plate 19. A matrix of hinge pin bores 29 directed through the tubular hinge pin 17 permit the expressing of a powdered graphite material 34 contained within the hinge pin central cavity 28. A plunger rod 30 includes a plunger rod piston head 31 at a lower distal end thereof in communication with upper surface of the graphite 34 within the cavity 28, with the piston head 31 effecting a sealing relationship interiorly of the bore. A plunger rod spring 32 is captured between the piston head 31 and the second flange plate receiving cavity 23 of the cup member 24. The plunger rod 30 extends through the cup member 24 and its top surface terminating in an indicator flag 33 mounted thereto, wherein as the graphite reservoir 34 is depleted, the flag 33 and the associated rod 30 are directed interiorly of the cavity from view. It is understood that the flag 33 may be discarded if desired as the projection of the rod 30 alone may be sufficient for indication of remaining graphite within the associated hinge pin central cavity 28.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A spectacle apparatus including a spectacle frame, the spectacle frame including a plurality of temple legs hingedly mounted to the spectacle frame, each temple leg hingedly mounted to the spectacle frame about a hinge assembly, and each hinge assembly including at least a first plate fixedly mounted to the spectacle frame, and at least one second plate fixedly mounted to the temple leg, each of the first and second plates arranged in a stacked relationship relative to one another, including a coaxially aligned hinge assembly bore, the hinge assembly bore is oriented parallel relative to the spectacle frame and the temple legs, and the hinge assembly bore including a tabular hinge pin directed therethrough, the tubular hinge pin includes a first flange plate mounted to a lower distal end of the hinge pin, and a second flange plate mounted to an upper distal end of the hinge pin, and the second flange plate is spaced above the first and second plates and includes a resilient cup member mounted to the second flange plate, the resilient cup member including a cavity to receive the second flange plate therewithin.

2. An apparatus as set forth in claim 1 wherein the second flange plate includes a planar top wall and an arcuate side wall, the arcuate side wall extending downwardly from the planar top wall to the tubular hinge pin, wherein the arcuate side wall is received within the second flange plate receiving cavity.

3. An apparatus as set forth in claim 2 wherein the resilient cup member includes an extension flange extending coplanar relative to the cup member top wall, with the extension flange including a bore, the bore arranged for receiving a free distal end of a flexible tether cord, and the flexible tether cord mounted to each hinge assembly.

4. An apparatus as set forth in claim 3 wherein the tubular hinge pin includes a hinge pin central cavity directed coextensively through the hinge pin, the hinge pin further includes a plurality of hinge pin bores directed through the hinge pin in communication with the central cavity, and the hinge pin bore directed through the hinge pin and the second flange plate, and a predetermined quantity of powdered lubricant positioned within the hinge pin central cavity.

5. An apparatus as set forth in claim 4 wherein the hinge pin bore includes a plunger rod coaxially directed within the hinge pin bore, the plunger rod including a plunger rod piston head fixedly mounted to a lower distal end of the plunger rod positioned in contiguous communication with the lubricant, and the plunger rod projecting through the cup member, and an indicator flag mounted to an upper distal end of the plunger rod, and a spring captured between the piston head and the cup member, with the spring positioned within the second flange plate receiving cavity.

* * * * *